(12) United States Patent
Gruenspecht et al.

(10) Patent No.: US 7,586,071 B2
(45) Date of Patent: *Sep. 8, 2009

(54) RF WELDING DEVICE WITH FILTERING AND TUNING

(76) Inventors: Mark Gruenspecht, 1299 E. Lake Dr., Tarpon Springs, FL (US) 34688; Timothy Hopper, 3401 Bayfield Blvd., Oceanside, NY (US) 11572

( * ) Notice: Subject to any disclaimer, the term of this patent is extended or adjusted under 35 U.S.C. 154(b) by 0 days.

This patent is subject to a terminal disclaimer.

(21) Appl. No.: 11/805,071

(22) Filed: May 22, 2007

(65) Prior Publication Data

US 2008/0041847 A1 Feb. 21, 2008

Related U.S. Application Data

(63) Continuation-in-part of application No. 11/338,026, filed on Jan. 24, 2006, now Pat. No. 7,220,950, which is a continuation of application No. 10/930,641, filed on Aug. 31, 2004, now Pat. No. 7,012,232.

(51) Int. Cl.
*H05B 6/50* (2006.01)

(52) U.S. Cl. .................. 219/765; 219/779; 219/778; 156/274.4; 156/380.4

(58) Field of Classification Search ......... 219/764–769, 219/778–780; 156/272.2–275, 379.6–380.8
See application file for complete search history.

(56) References Cited

U.S. PATENT DOCUMENTS

| | | | | |
|---|---|---|---|---|
| 3,431,380 | A * | 3/1969 | Butler et al. | 219/769 |
| 3,721,920 | A * | 3/1973 | Mann | 219/779 |
| 3,783,217 | A * | 1/1974 | Brown | 219/776 |
| 4,320,276 | A * | 3/1982 | Takeuchi et al. | 219/771 |
| 5,833,915 | A | 11/1998 | Shah | |
| 5,973,308 | A * | 10/1999 | Sternowski | 219/770 |
| 6,828,536 | B1 | 12/2004 | Grimes et al. | |
| 7,220,950 | B2 * | 5/2007 | Gruenspecht et al. | 219/765 |

* cited by examiner

*Primary Examiner*—Quang T Van
(74) *Attorney, Agent, or Firm*—Jordan and Hamburg LLP (57) ABSTRACT

An RF welder, and a method of operation thereof, is disclosed that has circuitry that automatically affects system impedance so that, throughout the welding or embossing cycle, a generator is capable of delivering the same power to a die and fabric, and cabling is capable of dissipating a load that is less than a preselected amount.

8 Claims, 7 Drawing Sheets

RF WELDING DEVICE WITH FILTERING AND TUNING

CROSS REFERENCE TO RELATED APPLICATION

This application is a continuation-in-part of U.S. patent application Ser. No. 11/338,026, entitled RF WELDING DEVICE filed on Jan. 24, 2006.

BACKGROUND OF THE INVENTION

The present invention relates to packaging machines, and more particularly relates to sealers used in horizontal form, fill, and seal packaging machines.

Machines that utilize Radio Frequency as the means for welding (RF Welders) are known in the art. RF welders are typically used for sealing and embossing appliqué on RF sealable materials. Such materials are commonly used in processing materials such as PVC, PU, PET, PETG and polyolefin. The welders process these materials in manufacturing, for example, vinyl envelopes and binders having internal pockets. For example, pockets are sealed to the binder on first and second side edges and a bottom edge, leaving a top edge open for egress. RF welding of the edges obviates the need for stitches.

Figure 2:
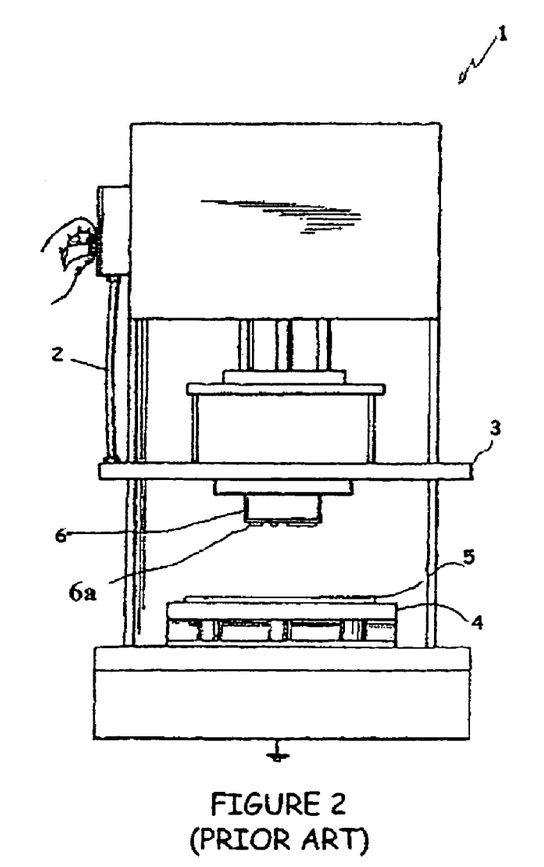
FIG. 2 is a front view of the RF Welding Machine according to the prior art.

The theory and implementation of RF welding is disclosed in U.S. Pat. No. 5,833,915, incorporated herein by reference. FIG. 2 discloses an RF welder 1 known in the art. A standard generator (not shown) provides power to the welder 1 at an FCC mandated frequency of 27.12 MHz, using standard 50 Ohm coaxial cable 2. The coaxial cable is used because it is an excellent conveyor of energy and suffers very little loss. The term load in this application should be understood to mean all components seen as a load with respect to the generator.

Referencing FIG. 2, the welder 1 has a top plate 3 and a bottom plate 4 that are used as electrodes for transferring electrical energy through a subject material 5 and die 6, where the die 6 has impressions 6a used for embossing or welding.

The die 6 is attached to the top plate 3 and acts as an electrode in tandem with the top plate 3. The die 6 has conductive electrical characteristics which alter the load characteristics. The material 5 is non-metallic and acts as a dielectric, absorbing energy passed between the top and bottom plates 3 and 4, to emboss or weld the material 5. The dielectric characteristics of the material 5 also alter the electrical characteristics of the load.

Accordingly, the impedance of the load is a combination of the impedance of all of the components in the electrical conduction loop plus the material being processed. Since the impedance varies from part to part and during the welding process, optimum power is not delivered to the weld with a manually fixed impedance match. If the matching network or the frequency generator automatically adjust the reactance of the load to maintain the correct impedance at the generator, maximum power is always delivered to the weld during processing giving a better, quicker and more efficient weld.

If not enough energy is delivered to the load the material 5 may not weld or fail to become embossed. If too much energy passes through the load, the material may burn and other load components may fail (such as the coaxial cable which can be over-dissipated).

If the frequency at which energy is delivered to the material is incorrect, the welding or embossing of that material will suffer lagging or leading, which is known to provide poor quality results. More specifically, the power that transfers through the fabric may rise continuously through the weld cycle, or the power may rise to a maximum value and fall as the die sinks into the material. Such a power fluctuation provides an uneven weld with potential undesirable results in, for example, weld strength or emboss appearance.

Accordingly, with differing load impedance characteristics, a result of changing load impedance, there may be a slow reaction by the fabric causing a slow start of the welding or embossing or a complete failure to weld or emboss the material. Other problems include flashing caused by a high voltage arc-over.

As a result of the unique impedance characteristic, the RF welder must be electrically tuned, via impedance matching, after placement of the die 6 and material 5 within the welder. After the tuning of the load impedance, the power delivered will be optimum and over-dissipation of the cables and other elements will not occur. Energy will be passed through the platen and fabric at frequency of 27.12 MHz, preventing lagging or leading of the welding or embossing process.

Figure 4:
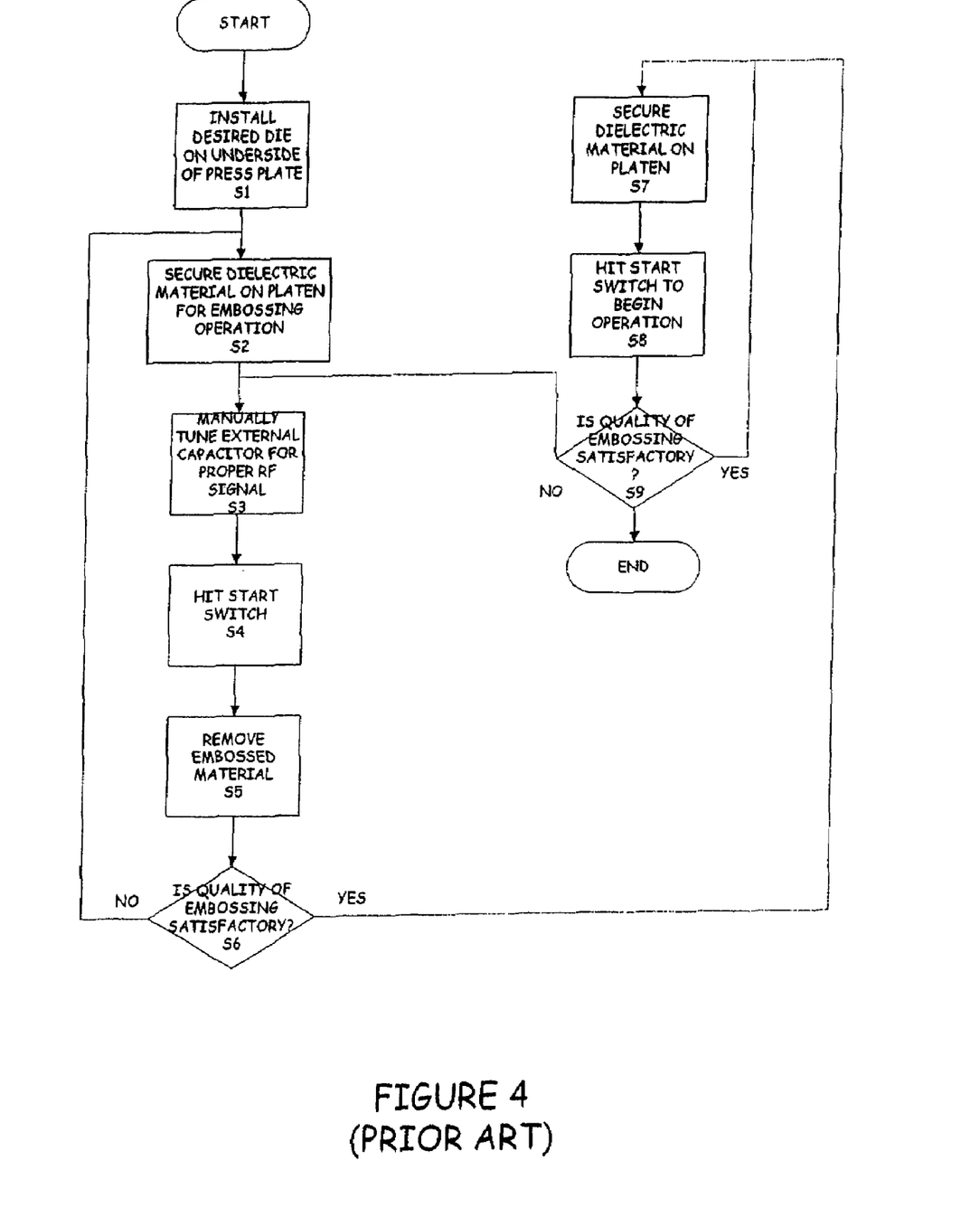
FIG. 4 is a schematic illustration of the method of operating the RF Welding Machine according to the prior art.

Normally, impedance matching occurs as illustrated in FIG. 4. As indicated, the die and material must first be installed on the machine at S1 and S2. The user is capable of adjusting the load impedance by manually adjusting a capacitor external to the generator at S3. The capacitor is adjusted by attempting to weld a material while adjusting capacitor electrodes towards or away from a sample dielectric. The RF welder 1 is calibrated by running the RF welder 1 and checking the material at S4 and S5 to determine if the quality is satisfactory at S6.

When the material welds appropriately, it is deduced that the RF welder 1 is tuned properly, the power is set correctly, and over-dissipation does not occur. Once the RF welder 1 is tuned, a series of identical materials can be welded or embossed at steps S7 and S8.

Various problems normally occur with the manual adjusting of the capacitor. First, it is relatively impossible for a person to adjust the capacitance so that the generator sees exactly 50 ohms due to the inherent sensitivity and robustness of the RF welder 1. Rather, manual adjusting typically provides at least a 5% error on the frequency adjustment. Also, a sample does not capture the dielectric characteristic for a series of materials since each individual piece of material has unique inconsistencies which affect the electrical characteristics of each weld. To adjust for these problems, the RF welder 1 must constantly be checked for quality at S9. Further, if non-identical materials or dies are used, then the RF welder 1 must be continuously retuned.

Even if the impedance is adjusted for each unique material 5, the material capacitance tends to change as the die sinks into the material. As the die sinks the capacitance changes, impedance changes, and optimum power is not transferred to the die and material. Accordingly, the falloff causes a decrease in the ability for the die to weld or emboss the material.

BRIEF SUMMARY OF THE INVENTION

It is the object of the invention to supply an RF welder that has circuitry which automatically adjusts the impedance of the load so that when welding occurs the same power is applied to the die and material in a consistent manner ensuring that over-dissipation does not occur to material, dies, or other load components.

The two exemplary embodiments disclosed adjust the impedance of the load in different manners. The first exemplary embodiment uses a matching network having a variable filter with a motor driven capacitor. The matching network has the capability of measuring the magnitude and phase of a radio frequency signal at its input and varies the filter impedance, by adjusting the motor driven capacitor, to match the impedance of the load to the generator. In the second embodiment, a variable frequency generator measures the reflected power or phase difference between voltage and current of a radio frequency signal at its output and varies the frequency of the power output by the generator thereby adjusting the impedance of the load, to match the impedance of the load to the generator.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
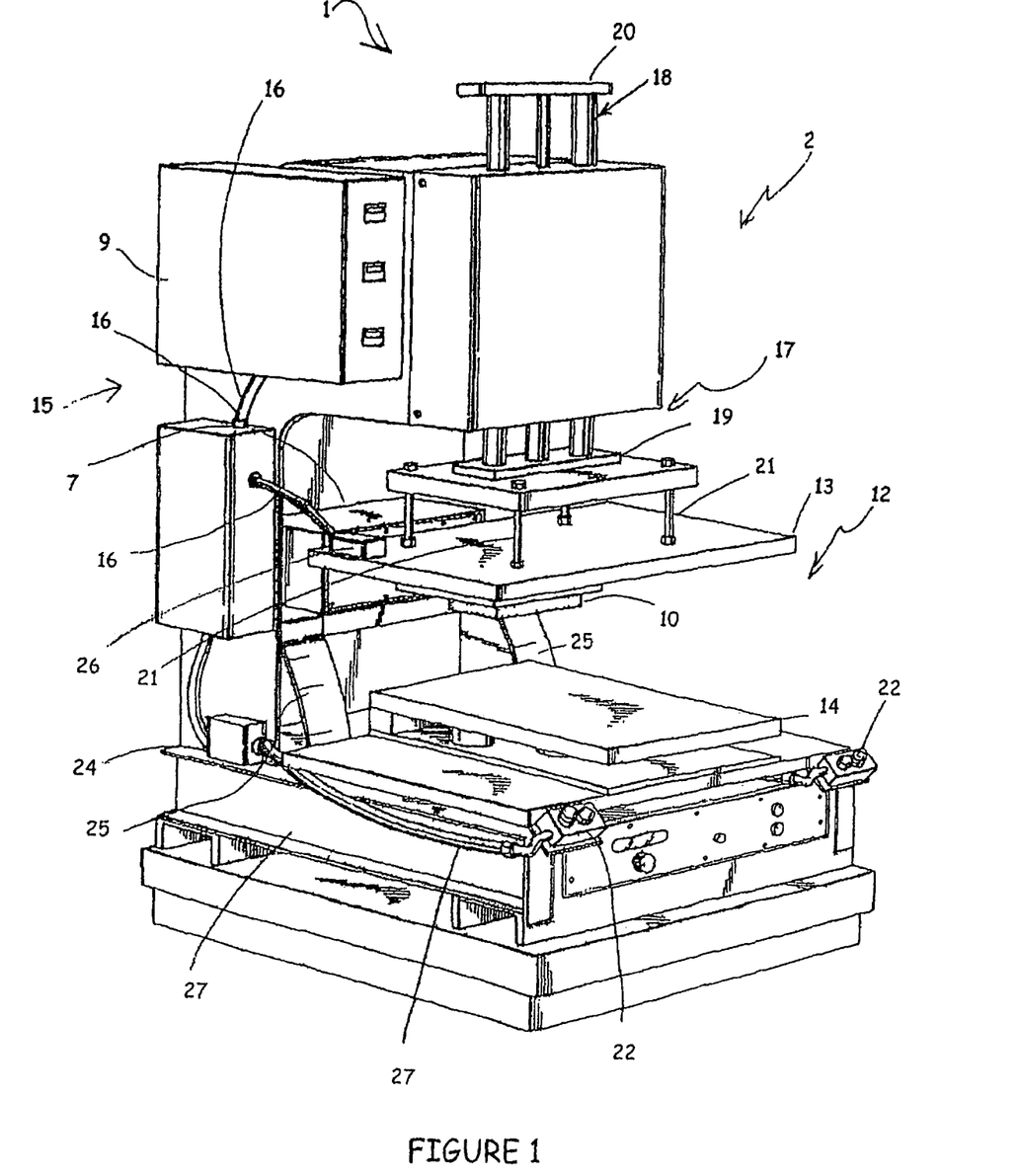
FIG. 1 is a perspective view of the RF Welding Machine.

Turning to FIG. 1, an RF welder 1 is disclosed that has circuitry 7 and software that automatically tunes the impedance of the die 10 and material 11 (FIG. 3) to match that of a solid state generator 9. Alternatively the solid state generator 9 may automatically tune the frequency of its output signal to match the impedance of the load to the generator. The tuning enables a maximum power transfer through the material 11.

Remaining with FIG. 1, the RF welder 1 has welding components 12 that include a top platen or plate 13 and bottom plate 14. Each plate 13 and 14 is manufactured from an electrically conductive material and is adapted to act as an electrode for an RF dielectric heating system. Each plate 13 and 14 is in communication with the high frequency RF generator 9 so that the top plate 13 is electrically hot and the bottom plate 14 serves as an electric ground.

Figure 3:
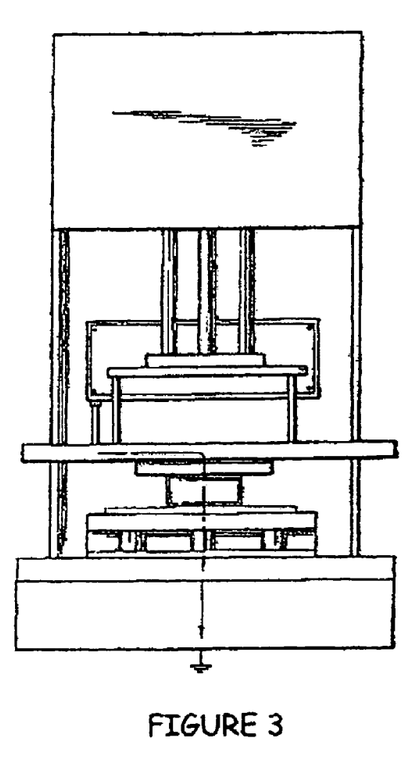
FIG. 3 is a front view of the RF Welding Machine with the top plate engaging the bottom plate and the generator activated.

The thickness of each plate is sufficient to prevent flexing or fatiguing of the plates by periodic loading of the plates. The top plate 13 is adapted to receive energy from the generator 9 and, as illustrated in FIG. 3, the bottom plate 14 is adapted to ground energy traveling from the top plate 13 through a conductive base 27. The plates 13 and 14 are parallel to each other and large enough to fit the die 10 and material 11.

The lower plate 14 is a stationary base. The top plate 13 is movable between an opened or home position and a closed or press position. The opened position spaces the top plate 13 from the lower plate 14 so that the die 10 can be changed and material 11 can be fed.

The top plate 13 is indirectly mounted to a plurality of platen arms 18 that move perpendicular to the pressing surface of the plate 13. The rate of motion of the plate arms 18 is relatively slow to minimize the injury risk upon inadvertent operator contact with the plate.

The range of motion for the top plate 13 is defined by the range of motion for the plate arms 18. The arms 18 are provided with a bottom plate 19 which defines the top range of motion and a top plate 20 which defines the bottom range of motion. The bottom range of motion, with the absence of the usable die 10, is 0.010 inches from the top face of the bottom plate 14. The separation minimum prevents the plates from buckling when power is transferred during operation. The die 10 and material 11 further limit the range of bottom motion that is reachable by the top plate 13 by creating a separation barrier between the top and bottom plates 13 and 14.

Between the arms 18 and the top plate 13 are four spacers 21. Each spacer 21 is parallel to and the same length as each other spacer. Each spacer is manufactured from a non-conductive material which prevents the power from the generator 9 from being transferred to arms 18.

The electrical control of the arms 18 is achieved through known techniques, such as those defined in U.S. Pat. No. 2,993,3600 incorporated herein by reference. After the press has been actuated by the operator, the operation of the press elements is coordinated via cam-operated micro-switches and limit switches at the ends of the strokes of the various reciprocating components. Alternatively, strain gauges are located in each spacer 21. The registered strain determines the maximum downward travel of the top plate 13.

The arms 18 are advanced and retracted, to advance or retract the top plate 13, with the use of activation switches 22. The switches are powered through cabling 23 that receives power from a standard electrical current, such as a 120 volt wall current, fed through a transformer 24.

Turning again to FIG. 3, advancing the top plate 13 maintains pressure on the die 10 for purposes of completing the embossing or welding of the material. The pressure is maintained for a period of time sufficient to ensure both that the material properly fills the die cavity so that the desired overall outer shape is achieved, and so that the complete formation of the embossed indicia is obtained. Dwell times for the press will be on the order of 0.1-5.0 seconds, preferably 1.0 to 3.0 seconds.

As compared to manually retracing the top plate 13, a timing relay switch maybe used for controlling the period of the application of the dielectric sealing current in accordance with the materials being added.

Figure 7:
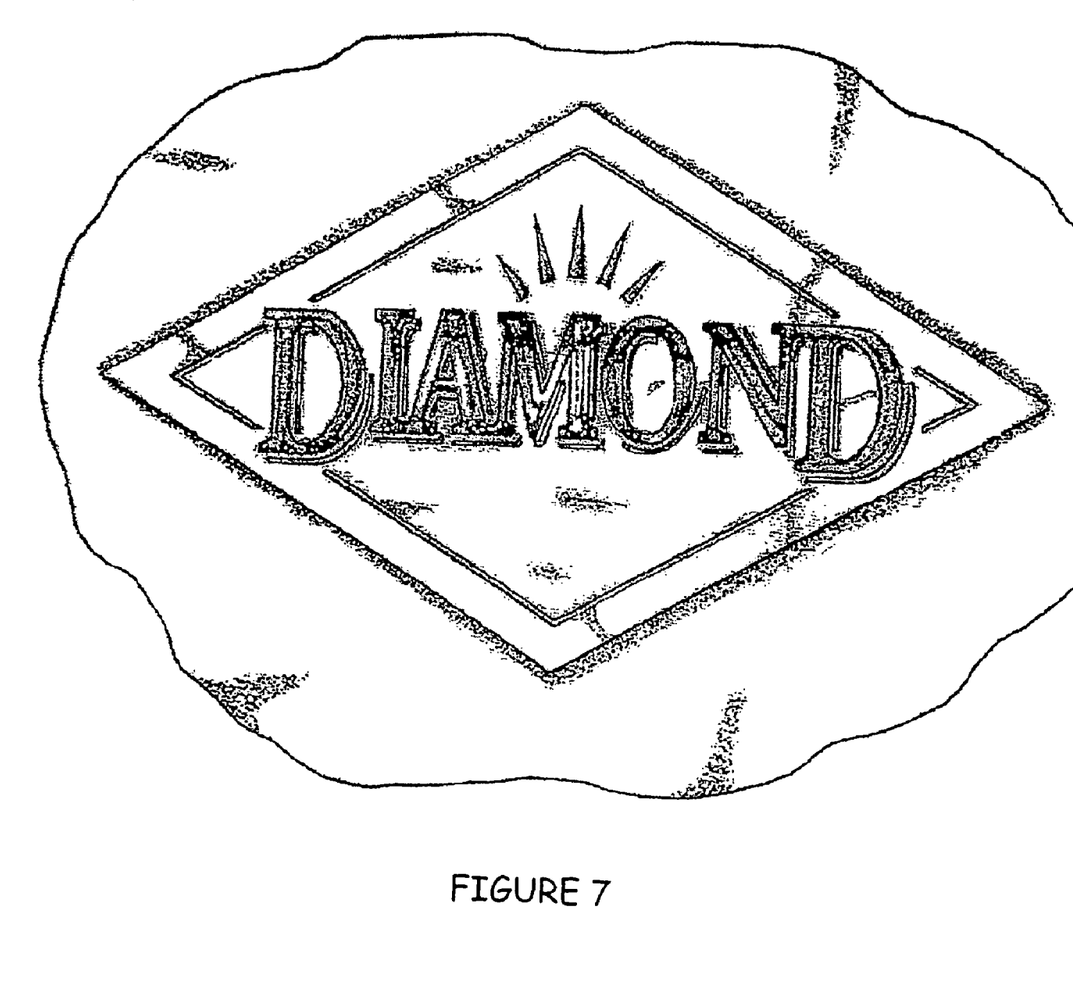
FIG. 7 is an illustration of a sample output from the RF Welding Machine.

Referring again to FIG. 1, the welding components 12 include the die 10. The die 10 is a typical die use for embossing or welding the material 11. FIG. 7, for example, illustrates a sample die having a diamond design about the word "Diamond."

Returning to FIG. 1, the die 10 has a cavity with inner walls and a bottom shape that is exactly like the desired final outward shape of the end product being the compressed product. The die 10 is made of material which is capable of withstanding the required welding and embossing pressures. Typically, the principle component of the die 10 is a steel alloy.

Another welding component 12 is the material 11. Material, which maybe welded or embossed, includes PVC, PET, RPET, PU, urethane and vinyl coated materials and other related sealable materials. The material is adapted to be sealed onto other different or identical materials, a.k.a. appliqué on material and material on material.

The RF welder 1 has power input components 15 which include the generator 9. The generator 9 in a first exemplary embodiment, is a solid state generator being, for example, model CX-1000A, 27.12 MHz by Comdel Corporation, of 11

Kondelin Road, Gloucester, Mass. 01930. The "1000A" stands for 1000 Watts, or 1 KW of power. In a second alternative embodiment of the invention a variable frequency generator, such as Comdel model CV1000, may be used as the generator 9. The amount of power required for a given application is dependent upon type or quantity of material that is subject to the RF welder 1.

A solid state generator is required as compared to an oscillator tube style generator. The oscillator tube style generator has an extensive swing in load impedance during use which renders the tuner incapable of matching the impedance of the platen to the generator. The solid state generator, on the other hand, is capable of operating at a 100% duty cycle and, notably, is capable of remote operation, i.e. the power supply is capable of being located in a separate room, with the efficiency of the RF welder 1 remaining in a high 90 percent efficiency.

Separating the power supply from the generator is advantageous for medical applications as the power supply portion can be put outside a clean room environment if needed. Separating the power supply is also advantageous for quality control purposes for allowing a separate control room where the operators of the machines are incapable of changing the setting arbitrarily.

Another benefit of a solid state generator is the efficiency at which the generator is capable of supplying power. Some materials weld better with differing frequencies or respond better to variable frequencies, such as frequencies that ramp downwardly through the welding or embossing process to account for material property changes through the welding process. The physical characteristics of alternating frequencies will be apparent, though unobvious, to those knowledgeable in the art.

The generator 9 in the first exemplary embodiment provides welding and embossing energy to the load at a fixed frequency such as 27.12 MHz. In the second exemplary embodiment the generator 9 is a variable frequency generator and provides energy at an adjusted frequency in a band advantageously around a predetermined frequency such as 27.12 MHz. The frequency for RF welding and embossing is set by governmental regulation, and it is to be appreciated that other frequencies could be-used where available by law.

The power supplied by the generator depends on the material being processed and the processing to the material. A typical generator for an embosser or welder produces 6 kilowatts (KW) or more of power. However, wattage both above and below 6 KW could be supplied, where necessary.

The cabling 16 is chosen because it is capable of carrying the current which results and is determined by the RF power supplied by the generator and the impedance of the load without failure due to over-dissipation. This cable is a standard cable for applications in RF Welding and embossing. A sample of the cabling is the type provided with one of the aforementioned generators by Comdel Corporation. It is to be appreciated that cabling having greater or lesser dissipative characteristics could be employed, where necessary. The power input 15 also includes a transducer 26 that transfers power from the generator to the top plate 13.

In the first exemplary embodiment of the invention there is a power regulator 17 which includes the impedance matching system 7 and is connected to the welding components 12. The impedance matching system 7 and the generator 9, electronically communicate through the coaxial cable 16. The impedance matching system 7 is, for example, model CPM-25, air cooled, single phase, 115 volt, vacuum variable caps by Comdel Corporation, 11 Kondelin Road, Gloucester, Mass. 01930, having power supply number CX 27.12 by Comdel, which is a known impedance matching network.

The impedance matching system 7 includes an algorithm that gradually slows the adjustment of the matching network capacitors so that precise impedance matching is achieved ensuring that the proper power is delivered to the load during the welding or embossing process. Even with high loads, the impedance matching system 7 is capable of being responsive to the change of material characteristics during the process.

Figure 8:
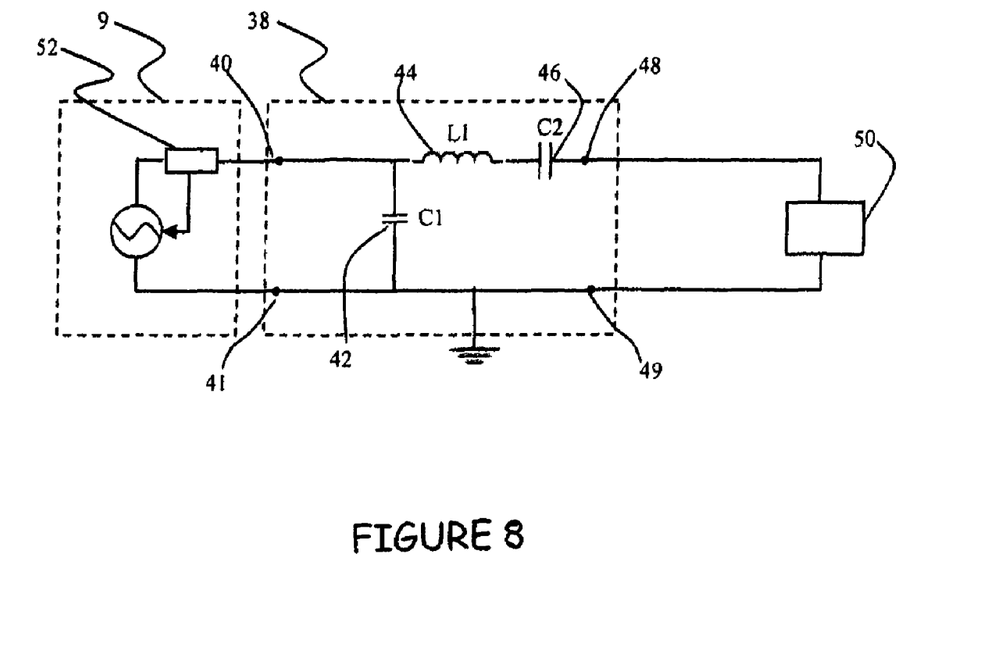
FIG. 8 is a schematic diagram of the load and generator of the second exemplary embodiment of the invention using a fixed filter.

In the second exemplary embodiment of the invention frequency tuning is used to match the impedances. The generator 9 is a variable frequency generator that supplies energy at a varying frequency within a band of frequencies that extend above and below a predetermined, advantageously chosen, frequency. The generator 9 has a control circuit 52 that adjusts the frequency of the RF energy output by the generator 9 to match the impedances between the generator 9 and the load. Therefore the impedance matching system 7 may be replaced with a fixed filter 38 that matches the impedance between the generator 9 and the load at the predetermined, advantageously chosen, frequency in the band of frequencies that the generator 9 will operate.

An exemplary configuration of the fixed filter 38 is illustrated in FIG. 8. As may be seen in FIG. 8, the fixed filter 38 is interposed between the generator 9 and all other load components 50. All other load components 50 may include and is not limited to: the welding components, material 11 and power regulator 17. The fixed filter 38 impedance should be determined based on the average or mean load impedance that will be experienced during processing. Alternatively the impedance matching system 7 may be used and the impedance matching algorithm is activated for the initial configuration of the impedance matching system 7.

When frequency tuning is activated during processing, the control circuit 52 measures the radio frequency signal at the input nodes 40 and 41 to the fixed filter 38 (i.e. at the generator 9 output), either for the reflected power or phase difference between voltage and current signals. The control circuit 52 then determines that the frequency should be changed in order to provide an impedance match between the generator 9 and the load and makes the necessary adjustment to the frequency of the generator 9. The control circuit 52 continues during the welding process, to monitor the signal and vary the frequency to maintain the impedance match between the generator 9 and the load. It is also understood by those in the art that other indicia of the electrical state of the RF welder at the generator 9 or another location within the RF welding circuit may be used to determine adjustment to the frequency of the generator 9.

The impedance characteristics of the welding components 12, such as the plates 13 and 14, the die 10 and the material 11, are based upon the solid structure and material properties of the components. The impedance characteristics differ from one piece of material to another and change throughout the welding or embossing processes in a manor which is known in the art. These changes affect the power being transferred through the load and the power required to be dissipated by the load components.

Both the first and second exemplary embodiments of the invention are designed to dynamically adjust the impedance that the generator sees so that the power level delivered is controlled and over-dissipation of the cables and other components does not occur. This ensures that the proper power is consistently delivered to the die 10 and material 11. The disclosed stabilizing technology optimizes amplifier (power supply and generator) performance, reducing power-gain changes caused by material 11 and die 10 impedance fluctuations, both dynamic and static.

The power regulator 17 includes cables 25 which are, for example, standard 25 pin peripheral cables adapted to transfer signals indicative of inductance and electrical characteristics of the welding components 12 to the impedance matching system 7 after the top plate 13 is pressed against the bottom plate 14. Signals traveling through the cables 25 are, for example, digital signals converted from an analog to digital converter (not shown). The a/d converter is connected to receive signals from the impedance matching system 7 in a manor that is readily apparent to one skilled in the art and analyzed and interpreted by the regulator 17 so that the regulator 17 may determine the electrical state of the load.

Due to the dynamic adjustments of the impedance matching system 7 in the first exemplary embodiment and the variable frequency generator 9 in the second exemplary embodiment, manual adjustments are unnecessary and iterations are not required to maintain the desired power characteristics. Accordingly, both the first and second exemplary embodiments account for differences in each unique material piece, each unique die, and the changing power characteristics that result during heating.

Figure 5:
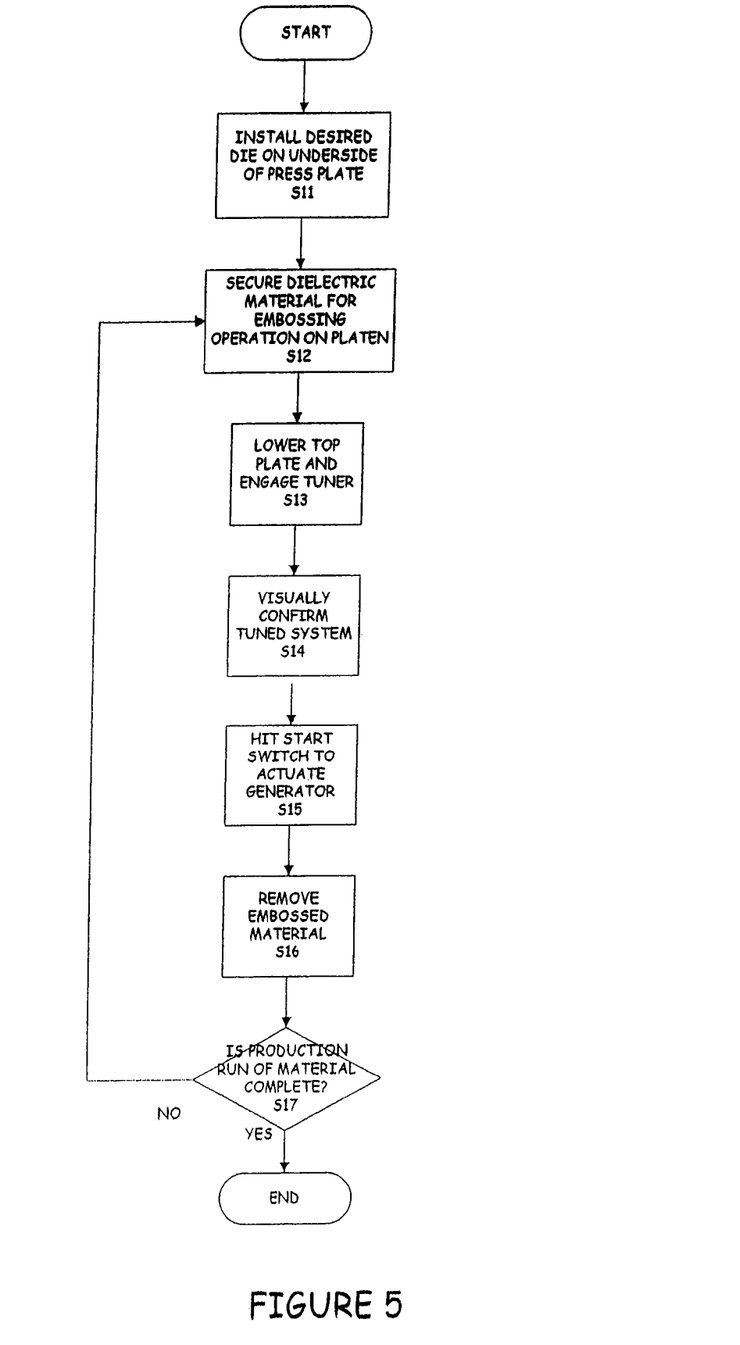
FIG. 5 is a block diagram of the method of operating the RF Welding Machine according to a first exemplary embodiment.

In FIG. 5, the operation of the first exemplary embodiment of the RF welder 1 is disclosed. The die 10 is installed on the underside of the top press plate 13 at step S11. The material 11 that is the subject of the embossing or welding is secured to the lower plate 14 at step S12. The top plate 13 is lowered onto the bottom plate 14 and the impedance matching system 7 is activated at step S13.

Once the plate 13 is lowered, the impedance matching system 7 reads and, as required, affects the impedance characteristics of the welding components 12. The adjusting prevents more than a 50 ohm load from being dissipated by the cables 16 and enables power to transfer continuously through the die 10 and material 11 at a frequency of 27.12 MHz. Once the impedance characteristics are tuned, the RF welder 1 is capable of indicating readiness with a visual or audible signal at S14. The generator 9 is automatically or manually activated and the impedance matching system 7 dynamically maintains the tuned characteristics throughout the embossing or welding cycle at step S15. Then the material is removed at step S16.

Since the material welding is optimized for each material piece, there is no need to manually re-tune before welding or embossing any individual piece of material. Accordingly, the welding or embossing of the next material pattern can continue at step S17. Alternatively, a new die can be installed and the process can begin again at step S11.

Figure 6:
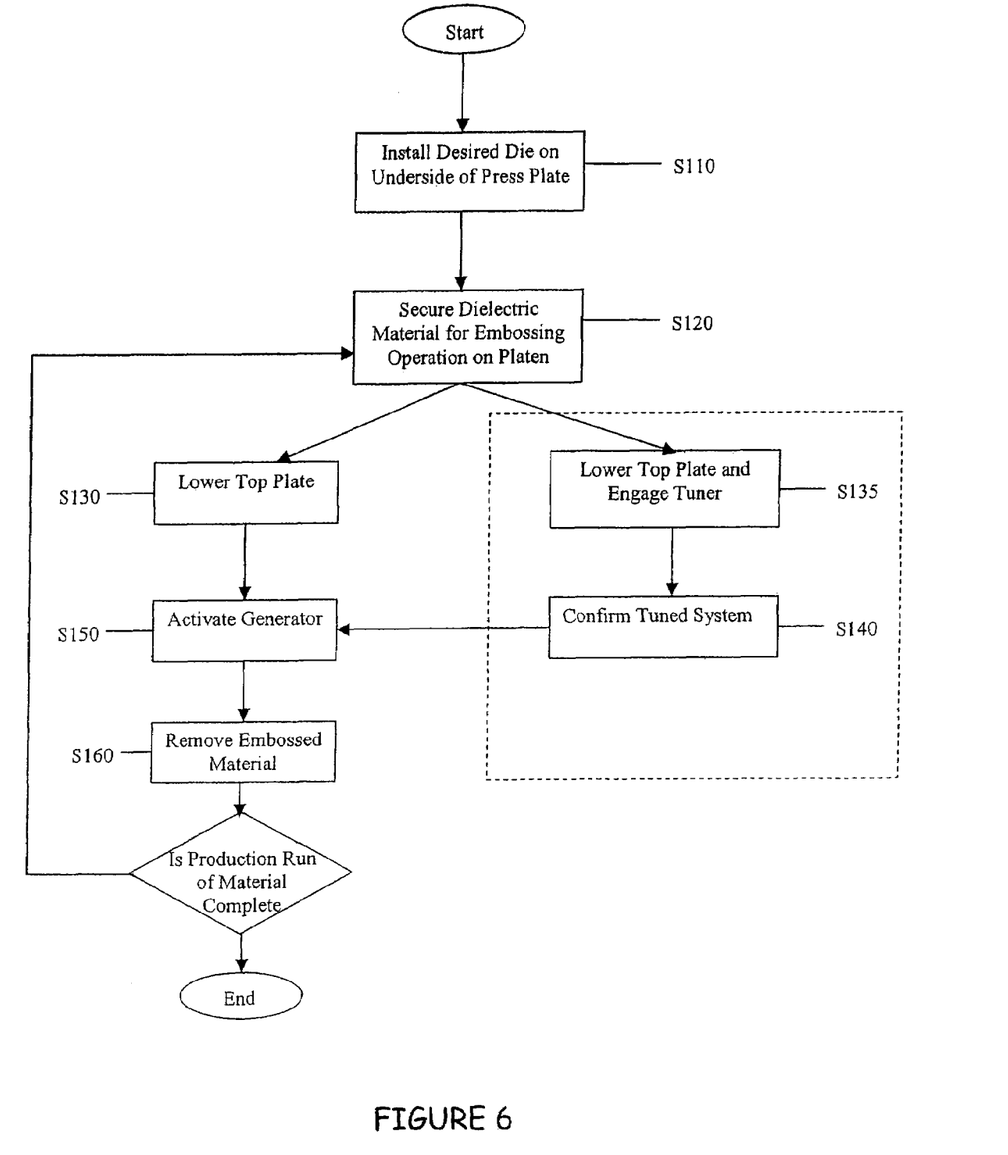
FIG. 6 is a block diagram of the method of operating the RF Welding Machine according to a second exemplary embodiment.

In FIG. 6, the operation of the second exemplary embodiment of the RF welder 1 is disclosed. The die 10 is installed on the underside of the top press plate 13 at step S110. The material 11 that is the subject of the embossing or welding is secured to the lower plate 14 at step S120. The top plate 13 is lowered onto the bottom plate 14 at step S130 and continues to step S150.

Alternatively, if the impedance matching system 7 is used, the top plate 13 is lowered onto the bottom plate 14 and the impedance matching system 7 is activated at step S135. Then once the plate 13 is lowered, the impedance matching system 7 reads and, as required, affects the impedance characteristics of the welding components 12. The adjusting prevents more than a 50 ohm load from being dissipated by the cables 16 and enables power to transfer through the die 10 and material 11 at a predetermined, advantageously chosen, frequency such as 27.12 MHz. Once the characteristics are tuned, the RF welder 1 is capable of indicating readiness with a visual or audible signal at S140 and the process proceeds to step S150.

Once the plate 13 is lowered, the generator 9 is automatically or manually activated and the generator 9 dynamically maintains the tuned characteristics by varying its output signal frequency throughout the embossing or welding cycle at step S150. Then the material is removed at step S160.

Since the material welding is optimized for each material piece, there is no need to manually re-tune before welding or embossing any individual piece of material. Accordingly, the welding or embossing of the next material pattern can continue at step S170. Alternatively, a new die can be installed and the process can begin again at step S110.

An RF welder 1 has been disclosed with circuitry that automatically affects the impedance of the load so that the generator 9 is capable of transferring maximum power through die 10 and material 11.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. An apparatus for performing a process of embossing, sealing, welding or fusing RF sealable material, the apparatus comprising:

a power source including a solid state variable frequency generator for providing a radio frequency output signal at a predetermined power the generator having a control circuit;

power components operating below a maximum predetermined power load in electrical communication with the variable frequency generator for transferring power from the generator towards the sealable material;

welding components for receiving the transferred power from the power components and transferring the power to the RF sealable material whereby the material is embossed, sealed, welded or fused;

a fixed filter in electrical communication between the power components and the welding components; and an automatic impedance tuning device in electrical communication between the power components and the welding components, the tuning device comprising electronically controlled capacitors;

wherein the control circuit monitors the electrical state of the apparatus and varies the radio frequency output signal so that: (1) delivery of said predetermined power remains substantially unchanged and (2) said power load in said power components remains below said maximum predetermined power load; and wherein the automatic impedance tuning device electronically measures the electrical state of the apparatus at the beginning of the process and adjusts the capacitors in the tuning device so that maximum power from the variable frequency generator is delivered to the welding components.

2. The apparatus of claim 1, wherein said power components include coaxial cabling.

3. The apparatus of claim 2, wherein said welding components include at least one conductive platen; and wherein the electrical state monitored by the variable frequency generator comprises the electrical characteristic of the platen.

4. The apparatus of claim 3 including at least one conductive die between said platen and said material wherein the electrical state monitored by the tuning device includes the electrical characteristic of said die.

5. A method of using an apparatus that applies RF power for performing a process defined by embossing, sealing, welding or fusing RF sealable material, the apparatus comprising:
a power source including a solid state variable frequency generator for providing a radio frequency output signal at a predetermined power the generator having a control circuit;
power components operating below a maximum predetermined power load in electrical communication with the variable frequency generator for transferring power from the generator towards the sealable material;
welding components for receiving the transferred power from the power components and transferring the power to the RF sealable material whereby the material is embossed, sealed, welded or fused;
a fixed filter in electrical communication between the power components and the welding components;
an automatic impedance tuning device in electrical communication between the power components and the welding components, the tuning device including electronically controlled capacitors;
the method comprising:
electronically monitoring, by the variable frequency generator, the electrical state of the apparatus;
controlling, by the variable frequency generator, the radio frequency output signal thereby modifying apparatus impedance throughout the process so that: (1) delivery of said predetermined power remains substantially unchanged and (2) said power load in said power components remains below said maximum predetermined power load; and
adjusting the capacitors in the tuning device thereby modifying the apparatus impedance to maximize power transferred from the generator to the welding components.

6. The method of claim 5, wherein said power components include coaxial cabling.

7. The method of claim 6, wherein said apparatus includes at least one conductive platen and the electrical state monitored by the variable frequency generator includes the electrical characteristic of the platen.

8. The method of claim 7, wherein said apparatus includes at least one conductive die between said platen and said material, and wherein the electrical state monitored by the variable frequency generator includes the electrical characteristic of said die.

* * * * *